Jan. 20, 1948.                R. W. FAIRWEATHER                2,434,644
                       SOUND WAVE DIRECTION DETERMINATOR
                            Filed July 30, 1945        3 Sheets-Sheet 1
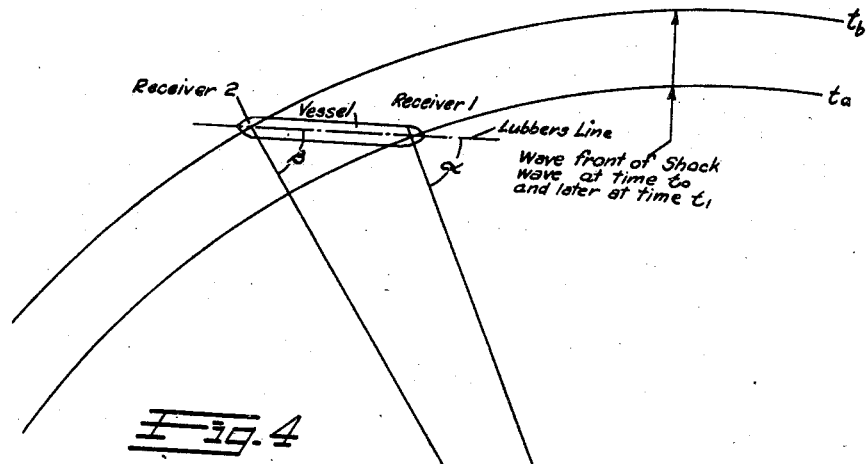
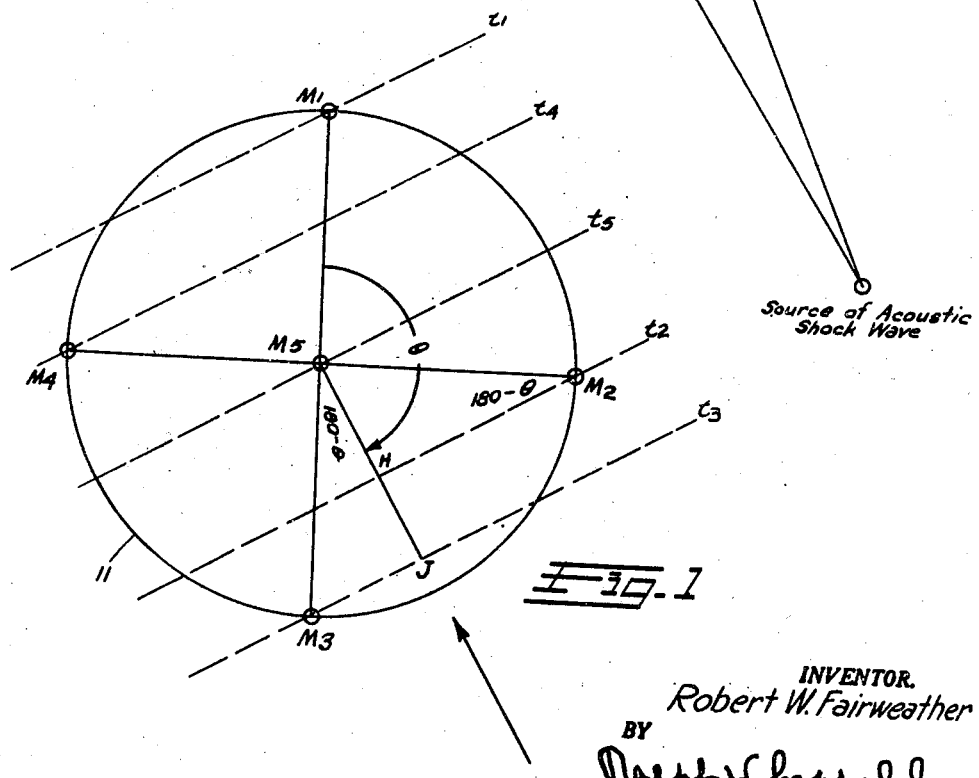
INVENTOR.
Robert W. Fairweather
BY
ATTORNEY

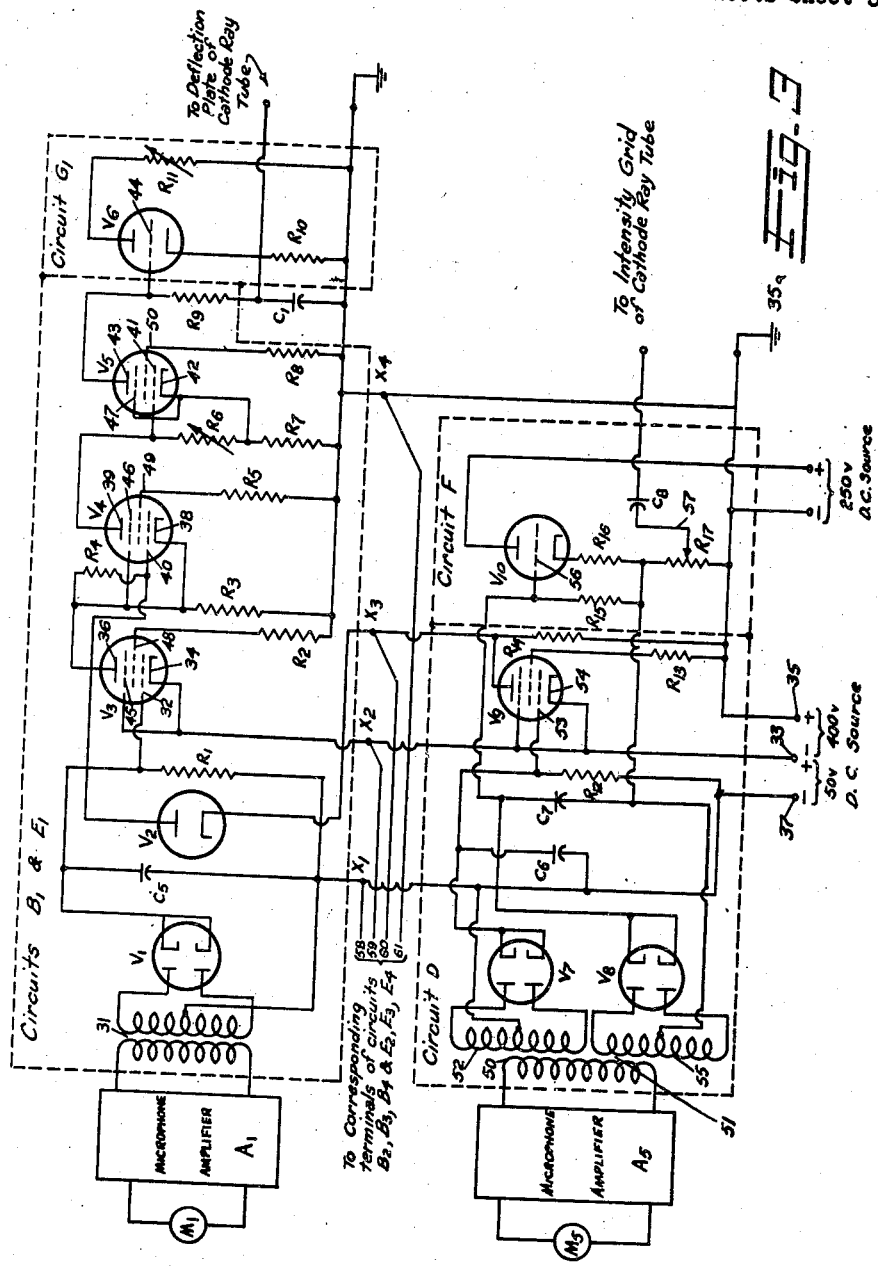

Patented Jan. 20, 1948

2,434,644

UNITED STATES PATENT OFFICE 2,434,644

SOUND WAVE DIRECTION DETERMINATOR

Robert W. Fairweather, Roslyn, N. Y.

Application July 30, 1945, Serial No. 607,900

6 Claims. (Cl. 177—352)

(Granted under the act of March 3, 1883, as amended April 30, 1928; 370 O. G. 757)

This invention relates to a method and apparatus for determining the direction of the source of an acoustic shock wave.

The device embodying the principles of this invention as described herein may be used to indicate visually either the horizontal or vertical component of the direction of the source of an acoustic shock wave with respect to the position of an observer. It will become apparent that with additional equipment using the same principle both components can be determined. For simplicity in exposition, however, the equipment used to determine only one component of the direction will be described. The device is readily adaptable for use in determining the direction of shock waves through any medium, such as the atmosphere, water or the earth.

If a wave leaving its source has not been diffracted, refracted, or reflected before reaching the observer, then the direction of travel of the wave front is exactly opposite the direction of the source as viewed by an observer. It is assumed in the description of the present device that no diffraction, refraction, or reflection of any consequence has occurred and that the device is sufficiently distant from the wave source that the wave front is essentially plane.

An object of the present invention is to provide a method for determining the source of an acoustic shock wave.

Another object is to provide apparatus for indicating the direction of the source of an acoustic shock wave.

Still another object is to provide apparatus for detecting and amplifying an acoustic shock wave and for visually indicating the direction of its source.

A further object is to provide apparatus whereby the source of an acoustic shock wave may be located.

Further objects and advantages of this invention, as well as its construction, arrangement and operation will be apparent from the following description and claims in connection with the accompanying drawings, in which Fig. 1 is a diagrammatic illustration showing the position of the detecting means of the apparatus of this invention in relation to an advancing wave front;

Fig. 3 is a circuit diagram of representative portions of the apparatus illustrated in block form in Fig. 2, and Fig. 4 is a diagrammatic illustration showing a use of the device of this invention in locating the source of an acoustic shock wave.

Fig. 1 shows four microphones $M_1$, $M_2$, $M_3$ and $M_4$ located at the quadrantal points on the circumference of circle $11$, and another microphone $M_5$ located at the center of the circle $11$. These microphones are non-directional and may be permanently mounted in their indicated positions.

Figure 2:
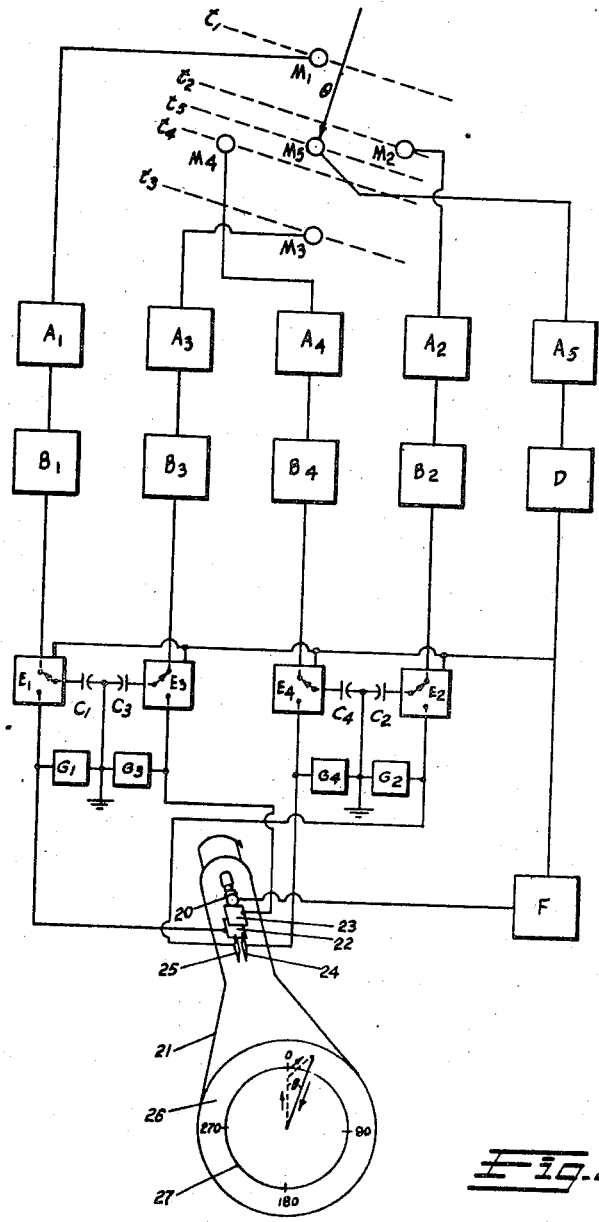
Fig. 2 is a block diagram showing one embodiment of the apparatus of this invention.

Letting $t_1$, $t_2$, $t_3$, $t_4$ and $t_5$ be the times when a wave front arrives at microphones $M_1$, $M_2$, $M_3$, $M_4$ and $M_5$, respectively, and assuming a wave front moving in the direction of the arrow, then the successive positions of the wave front are shown by parallel lines perpendicular to the arrow labelled $t_3$, $t_2$, $t_5$, $t_4$ and $t_1$.

It is apparent from the symmetry of microphone arrangement that:

$$(t_5-t_2)=(t_4-t_5) \quad (1)$$
$$(t_5-t_1)=t_3-t_5) \quad (2)$$

By symmetry triangles $M_3$—$M_5$—$J$ and $M_5$—$M_2$—$H$ are congruent. Therefore sides $M_3$—$J$ and $M_5$—$H$ are equal, sides $M_5$—$J$ and $M_2$—$H$ are equal, and sides $M_3$—$M_5$ and $M_5$—$M_2$ are equal and angles $M_3$—$M_5$—$J$ and $M_5$—$M_2$—$H$ are equal. Side $M_5$—$H$ is proportional to the interval of time $t_5$—$t_2$, therefore $M_3$—$J$ is also proportional to $t_5$—$t_2$, and side $M_5$—$J$ is proportional to the interval of time $t_5$—$t_3$. From this relationship and the properties of a right angled triangle side $M_3$—$M_5$ is proportional to $$\sqrt{(t_5-t_2)^2+(t_5-t_3)^2}$$

Then by trigonometry $$\sin(180-\theta)=\sin\theta=\frac{t_5-t_2}{\sqrt{(t_5-t_2)^2+(t_5-t_3)^2}} \quad (3)$$

$$\cos(180-\theta)=-\cos\theta=\frac{t_5-t_3}{\sqrt{(t_5-t_2)^2+(t_5-t_3)^2}} \quad (4)$$

By combining Equations 3 and 4 with 1 and 2 3 and 4 become $$\sin\theta=\frac{t_4-t_2}{\sqrt{(t_4-t_2)^2+(t_3-t_1)^2}} \quad (5)$$

$$\cos\theta=\frac{t_3-t_1}{\sqrt{(t_4-t_2)^2+(t_3-t_1)^2}} \quad (6)$$

Equations 5 and 6 would be obtained in the same manner regardless of the assumed direction of approach of the wave front. Equations 5 and 6 will give the angle $\theta$ which can have any value from 0° to 360° provided that value of $\theta$ is chosen which satisfies both 5 and 6. If 5 and 6 are both positive, θ lies between 0° and 90°. If 5 is positive and 6 negative, θ lies between 90° and 180°. If 5 and 6 are both negative, θ lies between 180° and 270°. If 5 is negative and 6 is positive, θ lies between 270° and 360°.

The device of this invention measures the time intervals accurately and using the principles described above indicates the angle θ visually as a transient luminous radial line on an azimuth circle on the fluorescent screen of a cathode ray oscilloscope. The device indicates any value of the angle θ from 0 to 360 degrees with respect to the zero axis. This is accomplished without human intervention in a fraction of a second. All the observer has to do is record the angles as luminous lines appear on the fluorescent screen of the oscilloscope as the device detects successive shock waves.

In Fig. 2 is shown a simplified block diagram of the device. The microphones are indicated as $M_1$, $M_2$, $M_3$, $M_4$, and $M_5$. Each microphone feeds into an associated amplifier indicated as $A_1$, $A_2$, $A_3$, $A_4$, and $A_5$, all of which are identical, i. e., have the same steady state as well as transient response.

The outputs of the amplifiers $A_1$, $A_2$, $A_3$ and $A_4$ feed into special electronic circuits $B_1$, $B_2$, $B_3$, $B_4$, and the output of amplifier $A_5$, fed by centrally located microphone $M_5$, feeds into special electronic circuit D. The B circuits when tripped by a pulse from the A amplifiers supply a voltage at a constant current to charge condensers $C_1$, $C_2$, $C_3$, and $C_4$. The D circuit when tripped by amplifier $A_5$ operates electronic switches $E_1$, $E_2$, $E_3$, and $E_4$ simultaneously and also operates a circuit F connected to the intensity grid 20 of a cathode ray tube 21 to control the cathode-ray intensity thereof. The operation of the electronic switches E breaks the connection between the B circuits and condensers C preventing them from accumulating any further charge and connects the condensers C to discharging circuits $G_1$, $G_2$, $G_3$, and $G_4$. Circuits $G_1$ and $G_3$ from oppositely disposed microphones $M_1$ and $M_3$ are connected to the vertical deflection plates 22 and 23, respectively, of the cathode ray oscilloscope tube 21, and circuits $G_2$ and $G_4$ from oppositely disposed microphones $M_2$ and $M_4$ are connected to the horizontal deflection plates 24 and 25, respectively, of the tube 21. The cathode ray oscilloscope tube 21 is provided with a transparent auxiliary screen 26 having an azimuth circle 27 thereon.

Operation of the device can best be understood by following the sequence of events that occur when the device is functioning normally. Assume that an acoustic shock wave is arriving in the direction of the arrow, Fig. 2. The wave front will arrive at microphone $M_1$ at time $t_1$, actuate the microphone, and send a pulse of energy through amplifier $A_1$ causing $B_1$ to start charging condenser $C_1$ at a constant rate, that is, with a constant current. This will cause the voltage across $C_1$ to increase linearly with time. After a short time interval, at time $t_2$, the wave front arrives at microphone $M_2$ actuating the microphone and sending a pulse of energy through amplifier $A_2$ causing $B_2$ to start charging condenser $C_2$ at a constant rate, the same as for circuit $B_1$. This will cause the voltage across $C_2$ to increase linearly with time. The wave will arrive at microphone $M_5$ at time $t_5$, actuate the microphone and send a pulse of energy through amplifier $A_5$ causing D to operate electronic switches $E_1$ and $E_2$ as well as $E_3$ and $E_4$ breaking the charging circuits to condensers $C_1$ and $C_2$ as well as $C_3$ and $C_4$ and a moment later connecting the condensers to discharging circuits $G_1$, $G_2$, $G_3$, and $G_4$. Circuit D also applies a positive bias to intensity grid 20 of the cathode ray tube 21 which is normally kept sufficiently negative to blank out the luminous spot. This positive bias causes the luminous spot to appear on the fluorescent screen of the tube at a point to the right of the center a distance proportional to the maximum voltage on condenser $C_2$ and above the center a distance proportional to the maximum voltage on condenser $C_1$. Since the voltage on condenser $C_1$ is proportional to the interval of time $(t_5-t_1)$ and also to $(t_3-t_1)$ and the voltage on condenser $C_2$ is proportional to the interval of time $(t_5-t_2)$ and also to $(t_4-t_2)$ it follows from 5 that $$\sin \theta = \frac{t_4-t_2}{\sqrt{(t_4-t_2)^2+(t_3-t_1)^2}}$$

and from 6 that $$\cos \theta = \frac{t_3-t_1}{\sqrt{(t_4-t_2)^2+(t_3-t_1)^2}}$$

When the condensers discharge, the luminous spot will trace a straight line from its off center position to the center of the fluorescent screen. If this screen has long persistence the position of the line can easily be determined. The angle that this line makes with the vertical is the angle θ which corresponds to the direction of the source of the sound wave relative to the zero quadrantal axis of the system. The transparent azimuth screen 26 over the fluorescent screen of the oscilloscope 21 permits the angle θ to be read from the degrees marked on the azimuth circle 27. If the intensity of the luminous spot remained constant during the cycle of charging and discharging, the spot would start at the center of the screen, follow the dotted line as shown on the oscilloscope in Figure 2 and return to the center following the solid line in the arrow direction.

The wave front continues in the same direction after leaving microphone $M_5$ striking microphones $M_4$ and $M_3$ in succession, but since electronic switches $E_4$ and $E_3$ have already been operated condensers $C_4$ and $C_3$ receive no charge and cannot influence the deflection of the oscilloscope beam. For shock waves arriving from any other direction the proper microphones, amplifiers, charging circuits and condensers come into play to trace the luminous line on the fluorescent screen of the oscilloscope to indicate the azimuth angle of the source.

Fig. 3, for purpose of illustration only, shows a detailed circuit diagram of one electronic system suitable for use in the parts of the equipment indicated by blocks in Figure 2. Only microphones $M_1$ and $M_5$, amplifiers $A_1$ and $A_5$, charging circuit $B_1$, electronic switch $E_1$, contact circuit D, condenser $C_1$, discharge circuit $G_1$ and intensity-control circuit F are shown since the other circuits and components are identical in both structure and operation. The microphones $M_1$ and $M_5$ and their accompanying amplifiers $A_1$ and $A_5$ are again shown symbolically in block form as any suitable non-directional microphone and conventional amplifying systems can be used. It will also be understood that other electronic systems can be substituted for that described below without departing from the principles of the invention as described and claimed herein.

A transient sound wave striking microphone $M_1$ (see Fig. 3) produces an electrical transient which is amplified by amplifier $A_1$ and sent to input transformer $31$. The current picked up by transformer $31$ is rectified by full-wave diode $V_1$ and conventional center-tap rectifier circuit including resistance $R_1$. The rectified current charges condenser $C_5$ with a polarity that swings the potential of control grid $32$ of pentode $V_3$ in a positive direction.

A constant potential is applied across the pentode $V_3$ from a source, the negative terminal $33$ of which is connected to the cathode $34$ of the tube $V_3$, and the positive terminal $35$ of which is connected to the anode $36$ of the tube $V_3$ through resistance $R_3$. The positive terminal $35$ is also connected to a ground $35a$. The pentode $V_3$ is ordinarily biased at anode current cut-off by bias voltage on control grid $32$ provided from negative terminal $37$ of the D. C. source through resistance $R_1$. When $C_5$ receives a charge the voltage on the control grid $32$ of pentode $V_3$ becomes less negative than the cut-off bias and anode current flows through resistance $R_3$.

Anode current flowing from $V_3$ now causes the potential of cathode $38$ of pentode $V_4$ to become negative with respect to its anode $39$ due to voltage drop across resistance $R_3$. The control grid $40$ of this pentode $V_4$ is at the same negative potential with respect to the anode $39$ as the cathode $38$, and anode current now flows from $V_4$ through resistances $R_6$ and $R_7$.

Anode current from $V_4$ now causes pentode $V_5$ to fire. The control grid $41$ of pentode $V_5$ is negative with respect to its cathode $42$ by an adjustable voltage drop across the resistance $R_6$, which is made adjustable for calibration purposes. The cathode $42$ becoming negative with respect to the anode $43$ due to voltage drop across resistance $R_7$, the tube $V_5$ fires and anode current flows through resistance $R_9$ and into condenser $C_1$, thereby charging condenser $C_1$.

The grid $44$ of triode $V_6$ is held below the bias necessary for anode current cut-off by the voltage drop across $R_9$ preventing anode current from flowing through this tube.

The suppressor grids $45$, $46$ and $47$ of pentodes $V_3$, $V_4$ and $V_5$ respectively are conventionally connected to the cathode terminals of the tubes as shown. The screening grids $48$, $49$ and $50$ of the pentodes $V_3$, $V_4$ and $V_5$ are also conventionally connected to their respective anode circuits through suitable resistances $R_2$, $R_5$ and $R_8$.

The pentodes $V_3$, $V_4$ and $V_5$ are operated under such conditions that the anode currents flowing in the tubes are practically constant, substantially independent of the anode voltages or resistances in the anode circuits. The pentodes are therefore sources of constant current. Thus condenser $C_1$, being charged with a constant current, accumulates a charge at a constant rate causing the voltage across its terminals to increase linearly with time.

The circuits described thus far correspond to those represented by blocks $B_1$ and $E_1$ of Figure 2. The other circuits $B_2$, $B_3$, and $B_4$ and $E_2$, $E_3$, $E_4$ (not shown on Figure 3), which are triggered by transients received by microphones $M_2$, $M_3$, and $M_4$, function in precisely the same manner as the circuits just described.

After a short interval of time the transient sound wave strikes microphone $M_5$ producing an electrical transient which is amplified by amplifier $A_5$, and sent to primary $50$ of input transformer $51$. This current is picked up by secondary $52$ of transformer $51$ and rectified by full wave diode $V_7$ and conventional center tap rectifier circircuit including resistance $R_{12}$. The rectified current charges condenser $C_6$ swinging the control grid $53$ of pentode $V_9$ in a positive direction.

A constant potential is applied across the pentode $V_9$ in a manner similar to that applied across pentode $V_3$. Cathode $54$ of the pentode $V_9$ is connected to the negative terminal $33$ of the D. C. source and anode $55$ of pentode $V_9$ is connected through resistance $R_{14}$ to the positive terminal $35$ of the D. C. source. The pentode $V_9$ is ordinarily biased at anode current cut-off by bias voltage on control grid $53$ provided from negative terminal $37$ of the D. C. source through resistance $R_{12}$. When the condenser $C_6$ receives a charge the voltage on the control grid $53$ of pentode $V_9$ becomes less negative than the cut-off bias and anode current flows through resistance $R_{14}$. This causes the anode potential at $V_9$ to become negative with respect to ground. The potential at terminal $X_3$ is then more negative than the control grid $40$ of pentode $V_4$ causing a current to flow through diode $V_2$. This causes the control grid $40$ of pentode $V_4$ to become sufficiently negative to cause anode current through $V_4$ to drop to zero, immediately stopping the charging current to condenser $C_1$. The current through $R_9$ also drops to zero thereby removing the cut-off bias from control grid $44$ of triode $V_6$ and allowing anode current to flow discharging condenser $C_1$ through adjustable resistance $R_{11}$ (which is a calibration adjustment). The voltage across condenser $C_1$ is monitored by the cathode ray tube (Figure 2) as previously explained. This completes the operation of the so-called electronic switch $E_1$ by circuit D and the discharge of condenser $C_1$ through discharge circuit $G_1$.

Simultaneously with the operation of the electronic switch $E_1$ by the circuit D the circuit F is actuated by circuit D to provide a potential which causes the intensity of the luminous spot of the cathode ray tube (Figure 2) to increase as the condenser $C_1$ discharges. In this operation secondary $55$ of transformer $51$ picks up the electrical transient which is then rectified by full-wave diode $V_8$ and conventional center-tap rectifier circuit including resistance $R_{15}$. The rectified current charges condenser $C_7$ swinging the control grid $56$ of triode $V_{10}$ in a positive direction. Anode current then increases through $V_{10}$, increasing the current through potentiometer $R_{17}$ and causing the positive potential of the adjustable arm $57$ of the potentiometer $R_{17}$ to increase with respect to ground. This potential charge appears on the other side of condenser $C_8$ and is sufficient to swing the intensity grid (Figure 2) of the cathode ray tube $21$ positive, thereby increasing the intensity of the luminous spot simultaneously with the discharging of condenser $C_1$.

Except in instances in which the wave front is approaching from 0, 90, 180, or 270 degrees, the voltage across two of the condensers $C_1$, $C_2$, $C_3$ and $C_4$ would be monitored simultaneously by the oscilloscope causing both lateral and vertical deflection of the luminous spot (as previously explained). At 0 and 180 degrees only vertical deflection would occur, and at 90 and 270 degrees only lateral deflection would occur.

The circuits $B_2$, $B_3$, $B_4$ and $E_2$, $E_3$, $E_4$ (not shown on Fig. 3) are provided with terminals identical to $X_1$, $X_2$, $X_3$ and $X_4$ shown for $B_1$ and $E_1$. Conductors $58$, $59$, $60$ and $61$ connect the corresponding terminals of the B and E circuits, not shown, in parallel with the terminals $X_1$, $X_2$, $X_3$ and $X_4$.

As explained before, the principle of angle measurement can be extended to indicate the vertical angle as well as the horizontal angle by using additional equipment. The virtue of this method of measurement lies in the fact that the accuracy of indication of the angle is independent of the actual velocity of the wave and merely requires that the velocity shall be constant while it sweeps past the microphones. The device described permits the determination of the direction of the source of an explosion or acoustic shock wave an instant after the wave has arrived. The device is ready for the reception of another shock wave a few hundredths of a second later.

The location of the source can be determined by triangulation using two sets of detecting equipment separated by a known distance. This is illustrated in Figure 4, wherein a ship is shown having a receiving set at bow and stern. Receiver 1 picks up a signal from the source of the acoustic shock wave at time $t_a$ and indicates the source of the wave to be at an angle $\alpha$ with the lubber's line of the ship. An instant later at the time $t_b$ the receiver 2 picks up the signal and indicates the source of the wave to be at an angle $\beta$ with the lubber's line. Using the two angles thus obtained and the known distance between the receivers, the source of the shock wave may easily be located by triangulation.

It is to be understood that various modifications and changes can be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. Apparatus for indicating the direction of the source of an acoustic shock wave, comprising a group of acoustically responsive detecting means, individual detecting means of said group being disposed along each of a pair of concurrent lines and on opposite sides of the intersection thereof, an additional acoustically responsive detecting means disposed substantially at the intersection of said lines, amplifying means associated with the detecting means of said group and said additional detecting means, electronic charging circuits associated with the part of the amplifying means associated with said group of detecting means, condenser means for receiving a charge from said electronic charging circuits, electronic discharging circuit means, electronic switching means responsive to the amplified output of said additional detecting means for switching said condenser means from said electronic charging circuits to said electronic discharging circuit means, and azimuth-indicating means associated with said discharging circuit means.

2. Apparatus for indicating the direction of the source of an acoustic shock wave comprising acoustically responsive detecting means positioned at each quadrantal point and at the center of a circle, amplifying means associated with each of said detecting means, an electronic charging circuit associated with each of said quadrantally positioned detecting means and its associated amplifier and responsive to a signal therefrom, condenser means associated with each of said electronic charging circuits for receiving a charge from said charging circuits, an electronic discharging circuit associated with each of said condenser means, electronic switching means responsive to a signal from said centrally located detecting means and its associated amplifier for switching said condenser means from said electronic charging circuit to said electronic discharging circuit, and azimuth-indicating means associated with said discharging circuit and responsive to the voltage upon said condenser means.

3. Apparatus for determining the direction of the source of an acoustic shock wave comprising a microphone positioned at each quadrantal point and at the center of a circle, amplifying means associated with each of said microphones, electronic means associated with each of said quadrantally positioned microphones and its associated amplifier, condenser means associated with each of said electronic means, each of said electronic means being responsive to a signal from its associated amplifier to supply a voltage at a constant current to charge its associated condenser means, electronic switching means in each circuit between said electronic means and said condenser means, said electronic switching means being responsive to a signal from said centrally located microphone and its associated amplifier to disconnect said condenser means and said electronic means and to connect said condenser means to discharging circuits, an oscilloscope having an azimuth circle upon its screen, the discharging circuits from one pair of oppositely disposed microphones being connected to the vertical deflection plates of said oscilloscope and the discharging circuits from the other pair of oppositely disposed microphones being connected to the horizontal deflection plates of said oscilloscope, whereby the luminous spot of said oscilloscope is deflected in proportion to the charges upon said condenser such that the position of the luminous spot upon the screen of said oscilloscope indicates the azimuth of the source of said shock wave.

4. Apparatus for indicating the direction of the source of an acoustic shock wave comprising acoustically responsive detecting means positioned at each quadrantal point and at the center of a circle, amplifying means associated with each of said detecting means, an electronic charging circuit associated with each of said quadrantally positioned detecting means and its associated amplifier and responsive to a signal therefrom, condenser means associated with each of said electronic charging circuits for receiving a charge from said charging circuits, an electronic discharging circuit associated with each of said condenser means, electronic switching means responsive to a signal from said centrally located detecting means and its associated amplifier for switching said condenser means from said electronic charging circuit to said electronic discharging circuit, an intensity control circuit also responsive to a signal from said centrally located detecting means, and an oscilloscope having an azimuth circle upon its screen, the vertical deflection plates of said oscilloscope being connected to the discharging circuits from one pair of oppositely disposed detecting means, the horizontal deflection plates of said oscilloscope being connected to the discharging circuits from the other pair of oppositely disposed detecting means, and the intensity grid of said oscilloscope being connected to the said intensity control circuit.

5. In a direction-indicating apparatus, the combination comprising a group of spaced means for receiving an acoustic wave, individual ones of said receiving means being disposed along each of a pair of orthogonal lines and on opposite sides of the intersection thereof, an additional receiving means at the intersection of said lines, amplifying means associated with said group and said additional receiving means, constant-current charging circuit means coupled to the part of said amplifying means associated with said group receiving means, condenser means for receiving a charge from said charging circuit means, a discharging circuit, and switching means responsive to the amplified output of said additional receiving means for switching said condenser means from said charging circuit means to said discharging circuit.

6. Direction-indicating means comprising a plurality of receiving means responsive to acoustic waves, individual ones of said plurality of receiving means being disposed along each of a pair of orthogonal lines and uniformly spaced from the intersection thereof, an additional receiving means at the intersection of said lines, condenser means coupled to said plurality of receiving means, and adapted to be charged in accordance with the time relationship of the reception of said plurality of waves by said receiving means, indicating means, and means including electronic switching apparatus responsive to said additional receiving means for switching said condenser means from said receiving means to said indicating means.

ROBERT W. FAIRWEATHER.

REFERENCES CITED

The following references are of record in the file of this patent:

UNITED STATES PATENTS

| Number | Name | Date |
| --- | --- | --- |
| 1,839,290 | Bailey | Jan. 5, 1932 |
| 2,304,965 | Sproule | Dec. 15, 1942 |
| 2,393,353 | Wirkler | Jan. 22, 1946 |
| 2,398,551 | Norton | Apr. 16, 1946 |
| 2,400,552 | Hoover, Jr. | May 21, 1946 |

FOREIGN PATENTS

| Number | Country | Date |
| --- | --- | --- |
| 323,182 | Great Britain | Dec. 20, 1929 |
| 59,729 | Norway | Dec. 4, 1939 |
| 181,665 | Switzerland | Sept. 1, 1936 |

---

Certificate of Correction

Patent No. 2,434,644.　　　　　　　　　　　　　　　　　　　　　January 20, 1948.

ROBERT W. FAIRWEATHER

It is hereby certified that errors appear in the printed specification of the above numbered patent requiring correction as follows: Column 2, line 3, and column 3, line 20, after the word "microphones" insert *or other acoustically responsive detecting or receiving means*; column 2, line 20, in the formula, before "$t_3$" insert an opening parenthesis; column 9, line 25, for "plurality of waves by said" read *waves by said plurality of*; and that the said Letters Patent should be read with these corrections therein that the same may conform to the record of the case in the Patent Office.

Signed and sealed this 25th day of May, A. D. 1948.

[SEAL]

THOMAS F. MURPHY,
*Assistant Commissioner of Patents.*

Certificate of Correction

Patent No. 2,434,644. January 20, 1948.

ROBERT W. FAIRWEATHER

It is hereby certified that errors appear in the printed specification of the above numbered patent requiring correction as follows: Column 2, line 3, and column 3, line 20, after the word "microphones" insert *or other acoustically responsive detecting or receiving means*; column 2, line 20, in the formula, before '$t_2$" insert an opening parenthesis; column 9, line 25, for "plurality of waves by said" read *waves by said plurality of*; and that the said Letters Patent should be read with these corrections therein that the same may conform to the record of the case in the Patent Office.

Signed and sealed this 25th day of May, A. D. 1948.

[SEAL]

THOMAS F. MURPHY,
*Assistant Commissioner of Patents.*